(12) United States Patent
Hirozawa et al.

(10) Patent No.: US 11,123,691 B2
(45) Date of Patent: Sep. 21, 2021

(54) SEPARATION MEMBRANE ELEMENT

(71) Applicant: TORAY INDUSTRIES, INC., Tokyo (JP)

(72) Inventors: Hiroho Hirozawa, Shiga (JP); Takuji Nishioka, Shiga (JP); Yoshiyuki Kitamura, Shiga (JP); Yutaro Suzuki, Shiga (JP); Fuka Ono, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/616,579

(22) PCT Filed: Apr. 26, 2018

(86) PCT No.: PCT/JP2018/017105
§ 371 (c)(1),
(2) Date: Nov. 25, 2019

(87) PCT Pub. No.: WO2018/221103
PCT Pub. Date: Dec. 6, 2018

(65) Prior Publication Data
US 2020/0078739 A1 Mar. 12, 2020

(30) Foreign Application Priority Data

May 30, 2017 (JP) .............................. JP2017-106238
Sep. 26, 2017 (JP) .............................. JP2017-184498
Sep. 26, 2017 (JP) .............................. JP2017-184499

(51) Int. Cl.
*B01D 63/10* (2006.01)
*B01D 65/08* (2006.01)
*B01D 61/02* (2006.01)

(52) U.S. Cl.
CPC ........ *B01D 63/10* (2013.01); *B01D 2313/143* (2013.01); *B01D 2313/146* (2013.01)

(58) Field of Classification Search
CPC .............. B01D 63/10; B01D 2313/143; B01D 2313/146; B01D 65/08; B01D 61/025; B01D 61/08; B01D 61/10; C02F 1/441
See application file for complete search history.

(56) References Cited

U.S. PATENT DOCUMENTS 6,656,362 B1 12/2003 Kihara et al.
2008/0190836 A1 8/2008 Beppu et al.
(Continued)

FOREIGN PATENT DOCUMENTS

CN 103180034 A 6/2013
CN 103566768 A 2/2014
(Continued)

OTHER PUBLICATIONS

International Search Report, issued in PCT/JP2018/017105, PCT/ISA/210, dated Jul. 31, 2018.
(Continued)

*Primary Examiner* — Waqaas Ali
(74) *Attorney, Agent, or Firm* — Birch, Stewart, Kolasch & Birch, LLP

(57) ABSTRACT

The present invention addresses the problem of providing a separation membrane element with which it is possible to stabilize the separation removal performance when a separation membrane element is operated. The present invention is a separation membrane element provided at least with a collecting pipe, a separation membrane, a feed-side channel material, and a permeation-side channel material, wherein: the feed-side channel material is configured from a fibrous column X configured from a plurality of fibrous materials A arranged in one direction and a fibrous column Y configured from a plurality of fibrous materials B arranged in a different direction to the fibrous column X; the fibrous materials A intersect the fibrous materials B to form intersections; and the fibrous materials A and/or the fibrous materials B have
(Continued)

a small-diameter part and a large-diameter part between adjacent intersections in a section plane parallel to the respective fibrous column.

4 Claims, 7 Drawing Sheets

(56) References Cited

U.S. PATENT DOCUMENTS

| | | |
|---|---|---|
| 2013/0220002 A1 | 8/2013 | Kobayashi et al. |
| 2013/0334128 A1 | 12/2013 | Takagi et al. |
| 2015/0068971 A1 | 3/2015 | Koiwa et al. |
| 2015/0133583 A1 | 5/2015 | Kim et al. |
| 2016/0136581 A1 | 5/2016 | Sawada et al. |
| 2016/0271564 A1 | 9/2016 | Yamada et al. |

FOREIGN PATENT DOCUMENTS

| | | | | |
|---|---|---|---|---|
| JP | 10-118468 A | | 5/1998 | |
| JP | 11-179352 A | | 7/1999 | |
| JP | 2000-437 A | | 1/2000 | |
| JP | 2007-117949 A | | 5/2007 | |
| JP | 2015-9182 A | | 1/2015 | |
| JP | 2015009182 A | * | 1/2015 | |
| JP | 2015-57273 A | | 3/2015 | |
| JP | 2015057273 A | * | 3/2015 | ........... B01D 53/228 |
| JP | 2015-525282 A | | 9/2015 | |
| WO | WO 2007/052529 A1 | | 5/2007 | |
| WO | WO 2012/091027 A1 | | 7/2012 | |
| WO | WO 2015/022832 A1 | | 2/2015 | |
| WO | WO 2015/064720 A1 | | 5/2015 | |
| WO | WO 2016/137965 A1 | | 9/2016 | |
| WO | WO-2016137965 A1 | * | 9/2016 | ............ B01D 63/10 |

OTHER PUBLICATIONS

Written Opinion of the International Searching Authority, issued in PCT/JP2018/017105, PCT/ISA/237, dated Jul. 31, 2018.
Office Action dated Feb. 16, 2021, in Indian Patent Application No. 201947049143.
Office Action dated Jun. 1, 2021, in Chinese Patent Application No. 201880034934.3.
Shi et al., Membrane Technology Handbook, 1st Edition, Chemical Industry Press (2001), p. 193, 6.4 Spiral Wound.

* cited by examiner

[Fig.1]
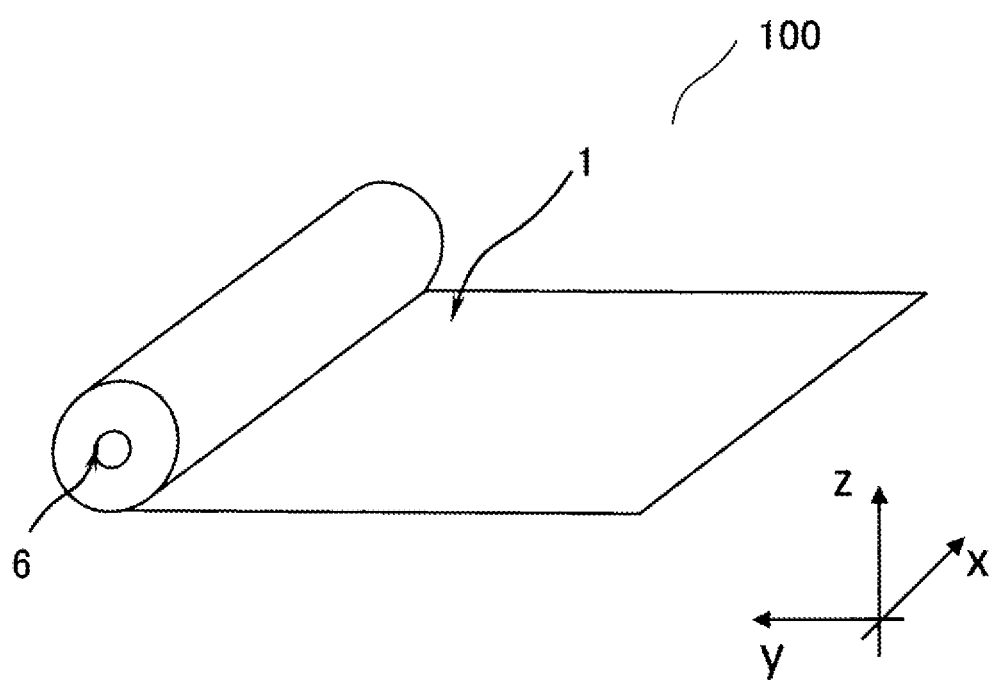

[Fig. 2]
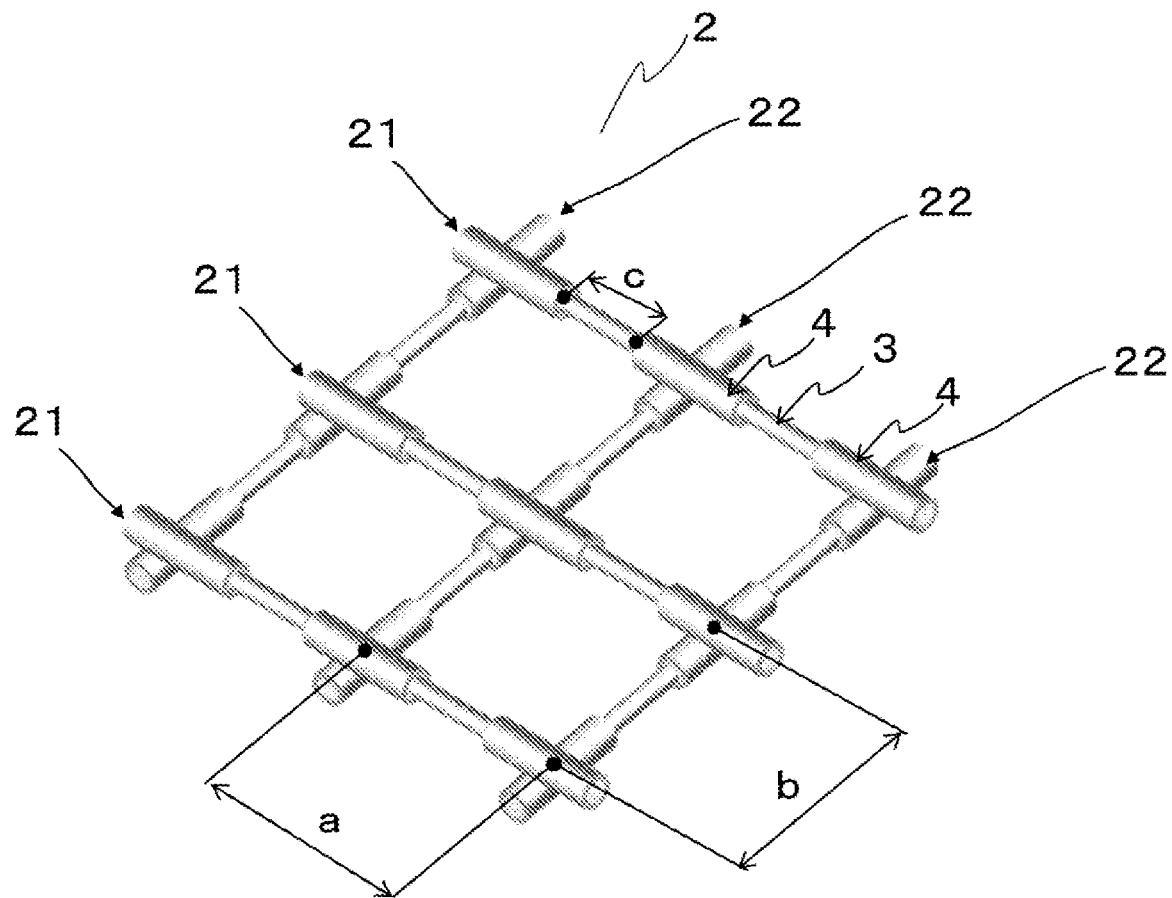

[Fig. 3]
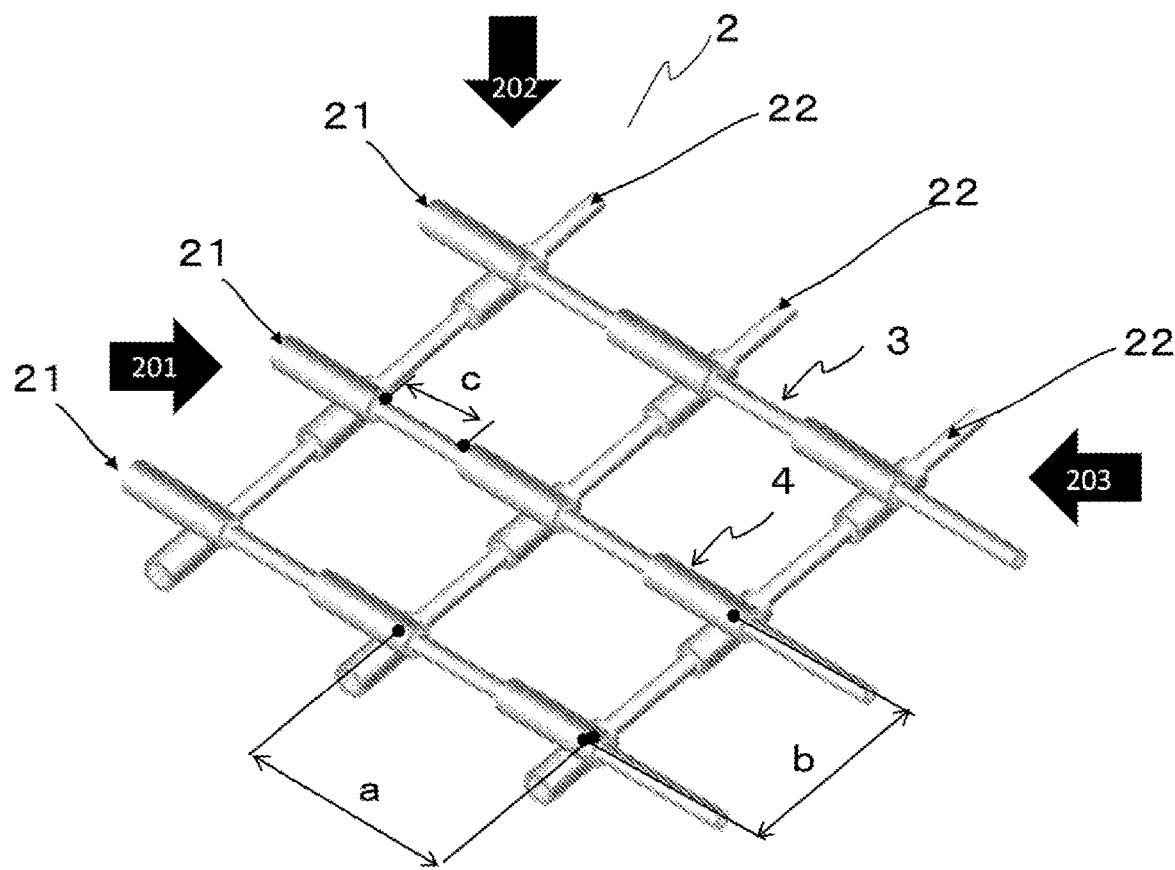

[Fig. 4]
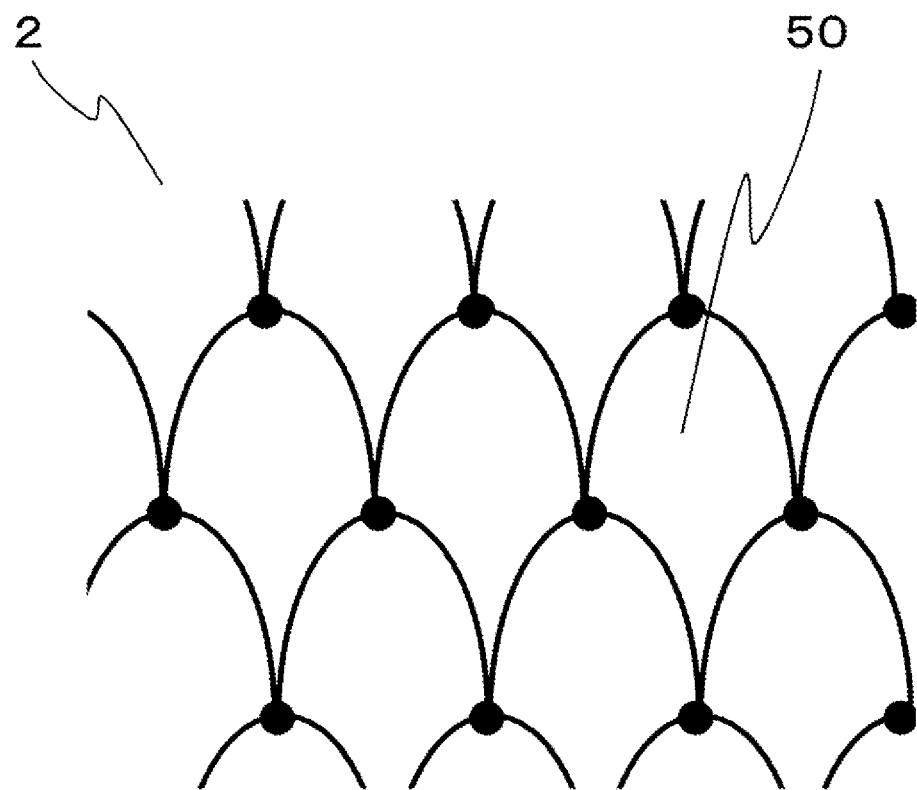

[Fig. 5]
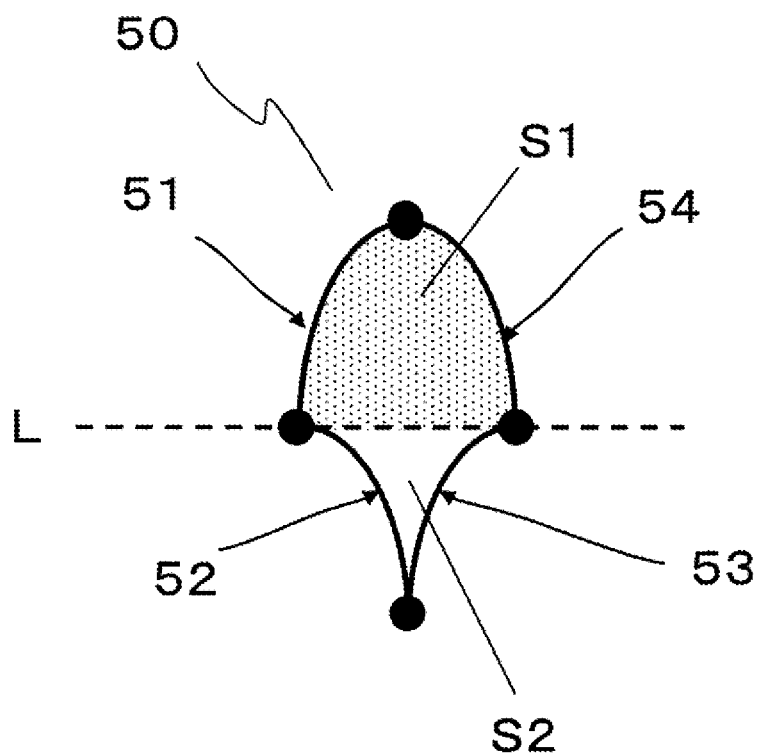
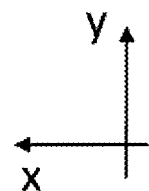

[Fig. 6]
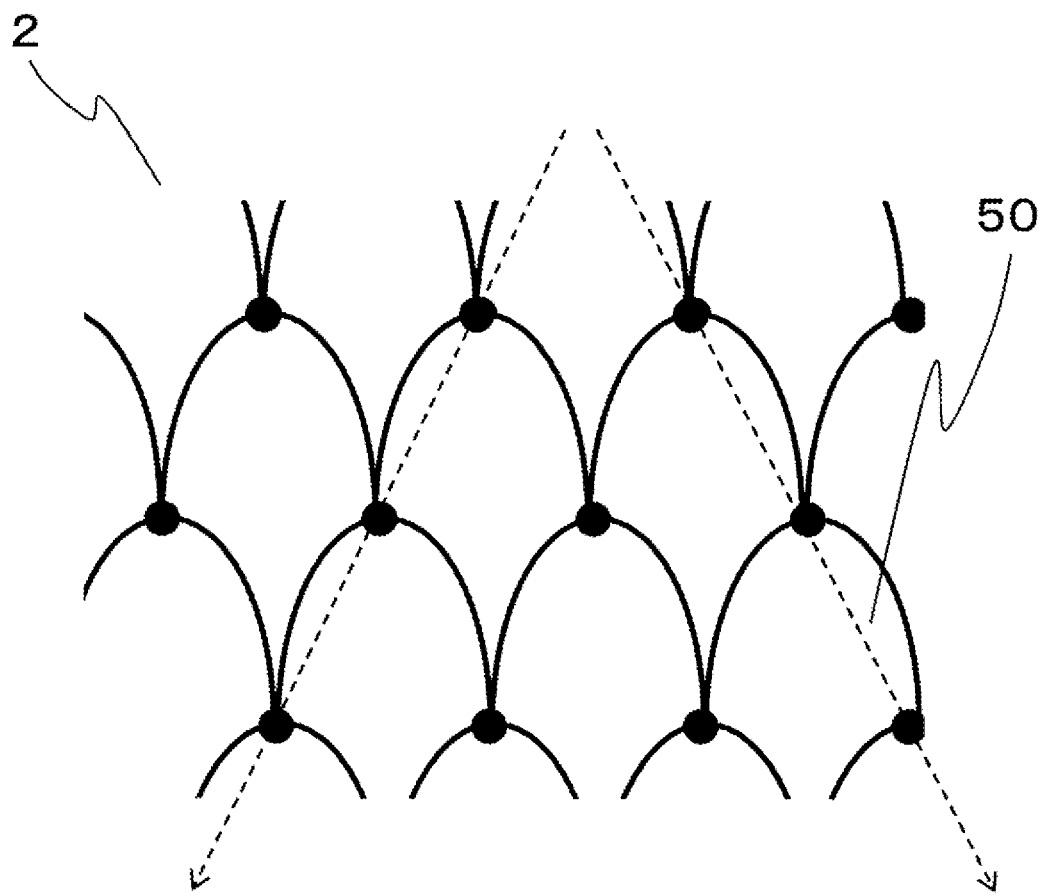

[Fig. 7]
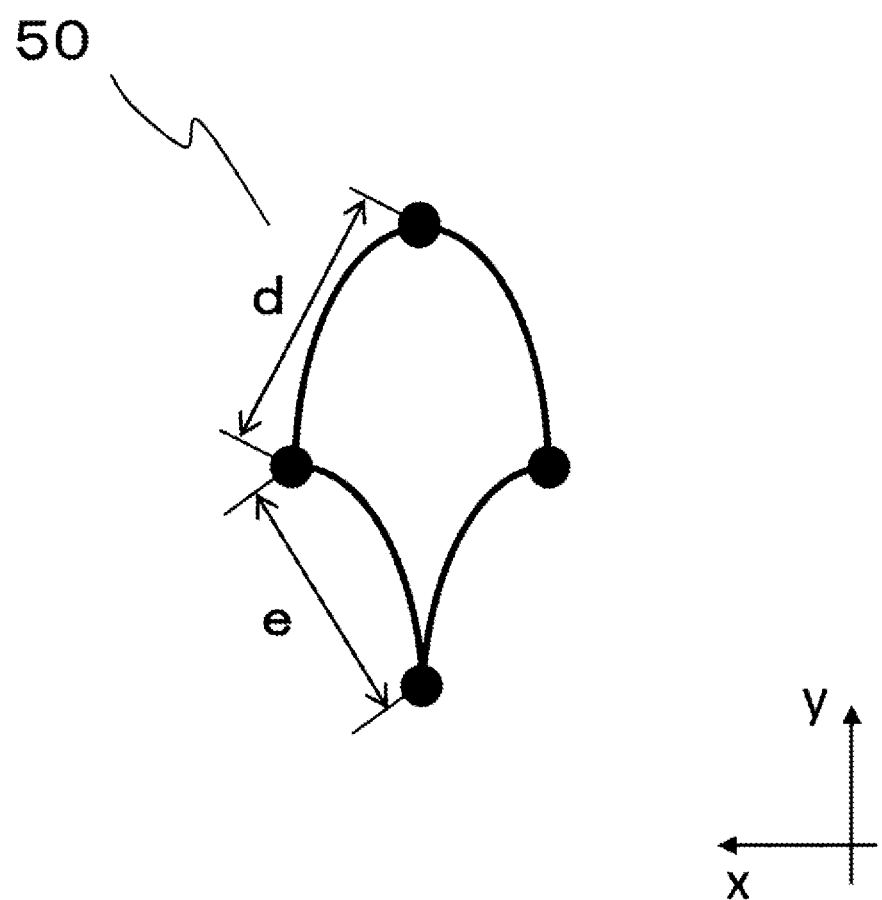

SEPARATION MEMBRANE ELEMENT

TECHNICAL FIELD

The present invention relates to a separation membrane element.

BACKGROUND ART

In the recent technique for removing ionic substances contained in seawater, brackish water, etc., separation methods utilizing separation membrane elements have found increasing uses as processes for energy saving and conservation of resources. Separation membranes adopted in the separation methods utilizing separation membrane elements are classified by pore size and separation performance into microfiltration membranes, ultrafiltration membranes, nanofiltration membranes, reverse osmosis membranes, and forward osmosis membranes. These membranes have been used, for example, in production of potable water from seawater, brackish water, water containing deleterious substances, or the like, production of ultrapure water for industrial uses, wastewater treatment, recovery of valuable substances, or the like, and have been used properly according to components targeted for separation and separation performance requirements.

Separation membrane elements have various shapes but are common in that feed water is supplied to one surface of the separation membrane and a permeate fluid is obtained from the other surface. A separation membrane element is configured to include a bundle of a large number of separation membranes so that the separation membrane element has an increased membrane area per element, namely, the separation membrane element yields a permeate fluid in an increased amount per separation membrane element. Various types of shapes, such as a spiral type, a hollow fiber type, a plate-and-frame type, a rotating flat-membrane type, and a flat-membrane integration type, have been proposed for separation membrane elements, according to their uses and purposes.

For example, spiral-type separation membrane elements are widely used in reverse osmosis filtration. The spiral-type separation membrane element includes a water collection tube and separation membrane leaves wound around the water collection tube. The separation membrane leaves are each formed by stacking a feed-side channel material for supplying feed water (i.e., water to be treated) to a separation membrane surface, a separation membrane for separating components contained in the feed water, and a permeate-side channel material for leading a permeate-side fluid which has been separated from the feed-side fluid by passing through the separation membrane, into the water collection tube. The spiral-type separation membrane element is advantageously used because a pressure can be applied to the feed water and a permeate can hence be taken out in a large amount.

For inhibiting a separation membrane element from decreasing in performance due to concentration polarization, use may be made, for example, of a method in which the feed-side channel material is made thinner to heighten the membrane-surface linear velocity of the feed water and cause turbulent flows near the surface of the separation membrane, thereby reducing the thickness of a concentration-polarization layer. However, the reduction in the thickness of the feed-side channel material may pose a problem in that foulants attributable to the impurities and microorganisms contained in the feed water clog the feed-side channels and this clogging reduces the performance of the separation membrane element or increases the pressure loss of the separation membrane element to heighten the power necessary for the pump for supplying the feed water, resulting in an increase in electric-power cost, or to cause a damage to the separation membrane element. Improvements in the performance of a separation membrane element by a feed-side channel material have hence been proposed.

Specifically, Patent Documents 1 and 2 each propose a net having reduced flow resistance attained by controlling the arrangement of fiber-form objects included in the feed-side channel material. Patent Document 3 proposes a woven channel material in which the warp and the weft each have a noncircular cross-section.

CITATION LIST

Patent Literature

Patent Document 1: JP-A-2015-526282
Patent Document 2: JP-A-2000-000437
Patent Document 3: JP-A-10-118468

SUMMARY OF INVENTION

Technical Problem

However, the separation membrane elements described above were insufficient in balance between the flow resistance of the feed-side channel material and the occurrence of turbulent flows. In particular, they were insufficient in elimination of the stagnation of feed water around the intersections of fiber-form objects. Accordingly, an object of the present invention is to provide separation membrane elements which can stabilize separation/removal performance especially when operated under a high pressure.

Solution to Problem

In order to accomplish the object, the present invention provides a separation membrane element including at least a water collection tube, a separation membrane, a feed-side channel material, and a permeate-side channel material, in which the feed-side channel material is configured of a fibrous row X configured of a plurality of fiber-form objects A arranged in one direction and a fibrous row Y configured of a plurality of fiber-form objects B arranged in a direction different from the direction for the fibrous row X, the fiber-form objects A intersect the fiber-form objects B to form intersections, and the fiber-form objects A and/or the fiber-form objects B have a small-diameter part and a large-diameter part between adjacent intersections in a section thereof parallel to the respective fiber-form object.

The present invention further provides a separation membrane element including at least a water collection tube, a separation membrane, a feed-side channel material, and a permeate-side channel material, in which the feed-side channel material has regions therein which have been separated by fiber-form objects and are reticulately continuous, the regions are each defined by four, two approximate curves of which form an approximate parabola, and in which in cases when a straight line connecting both ends of the approximate parabola is referred to as a straight line L, and when an area of a portion surrounded by the straight line L and the approximate parabola is expressed by S1 and an area of a portion in the region other than S1 is expressed by S2, then the S1 and the S2 satisfy the relationship S1>S2, and the fiber-form objects have a large-diameter part having a diameter R1 and a small-diameter part having a diameter R2, the R1 and the R2 satisfying the relationship R1>R2.

According to a preferred mode of the present invention, the separation membrane element is provided in which the small-diameter part has been disposed in a center position with respect to the large-diameter part in a thickness direction of the feed-side channel material.

According to a preferred mode of the present invention, the separation membrane element is provided in which a proportion of the diameter R2 of the small-diameter part to the diameter R1 of the large-diameter part is 0.17 or more and 0.78 or less.

According to a preferred mode of the present invention, the separation membrane element is provided in which a proportion of a length of the small-diameter part to a length of the approximate parabola connecting intersections in the feed-side channel material is 0.25 or more and 0.80 or less.

According to a preferred mode of the present invention, the separation membrane element is provided in which the small-diameter part has a tensile modulus of 200 MPa or more and 1,000 MPa or less.

According to a preferred mode of the present invention, the separation membrane element is provided in which the large-diameter part has been disposed only at one end of the small-diameter part between adjacent intersections.

Advantageous Effects of Invention

According to the present invention, it is possible to obtain separation membrane elements in which fouling that occurs during the operation of the separation membrane elements can be made to proceed more slowly and an increase in differential pressure due to clogging of the feed-side channels can be inhibited and which therefore have excellent operation stability.

BRIEF DESCRIPTION OF DRAWINGS

FIG. 1 is a developed slant view illustrating one mode of a separation membrane element.

FIG. 2 is a plan view of one example of the feed-side channel material included in a separation membrane element of the present invention.

FIG. 3 is a plan view of another example of the feed-side channel material included in a separation membrane element of the present invention.

FIG. 4 is a plan view of still another example of the feed-side channel material included in a separation membrane element of the present invention.

FIG. 5 is one example of reticulate regions in the feed-side channel material included in a separation membrane element of the present invention.

FIG. 6 is a plan view of another example of the feed-side channel material included in a separation membrane element of the present invention.

FIG. 7 is another example of reticulate regions in the feed-side channel material included in a separation membrane element of the present invention.

DESCRIPTION OF EMBODIMENTS

Embodiments of the present invention are explained below in detail.

<Separation Membrane Elements>

As illustrated in FIG. 1, a separation membrane element (100) includes a water collection tube (6) and a separation membrane (1) wound around the water collection tube (6). The direction of the x axis shown in FIG. 1 is the longitudinal direction of the water collection tube. The direction of they axis is perpendicular to the longitudinal direction of the water collection tube.

<Feed-side Channels>

(Feed-side Channel Materials)

One aspect of the feed-side channel material included in a separation membrane element of the present invention is configured, as FIG. 2 illustrates, of a fibrous row X configured of a plurality of fiber-form objects A (21) arranged in one direction and a fibrous row Y configured of a plurality of fiber-form objects B (22) arranged in a direction different from the direction for the fibrous row X, the fiber-form objects A (21) intersect the fiber-form objects B (22) at a plurality of sites.

For inhibiting the adhesion of foulants to the fiber-form objects or for inhibiting concentration polarization on the separation membrane surface, it is important to heighten the degree of turbulent flows around the fiber-form objects. This is because portions of the feed water which have not come into contact with the separation membrane surface are supplied by turbulent flows to the separation membrane surface. Since feed water flows while spreading along interstices among the fiber-form objects of the feed-side channel material, the fiber-form objects not parallel to the flow direction of the feed water constitute an obstacle to the flow of the feed water and serve to heighten the degree of turbulent flows. Meanwhile, the fiber-form objects not parallel to the flow direction of the feed water block up the channels to obstruct the flow of the feed water, and hence tend to heighten the flow resistance. In cases when each fibrous row is configured so as to have a small-diameter part (3) and a large-diameter part (4) between adjacent intersections in a section thereof obtained by cutting the fiber-form object along the center thereof in the thickness direction, and when the fibrous row is examined from above the plane thereof, then an improved balance is obtained between the intensity of turbulent flows and flow resistance. This effect is further enhanced especially when the fibrous row has a structure in which a large-diameter part has been disposed at one end of a small-diameter part as illustrated in FIG. 3. In the case where a large-diameter part has been disposed at one end of a small-diameter part, the other end of the small-diameter part where no large-diameter part has been disposed intersects, as such, at an intersection. Specifically, by making the fiber-form objects partly have a reduced diameter, the channels are enlarged to reduce the flow resistance. Usually, an enlargement of channels results in a decrease in feed-water flow rate and a decrease in the intensity of turbulent flows. However, in cases when the fiber-form objects are made to partly have a reduced diameter to facilitate fluid movement, without increasing the distance between intersections to enlarge the channels, then the feed water present around the intersections where channeling has conventionally occurred is apt to move and, hence, the intensity of turbulent flows is maintained while keeping the flow resistance low. This makes it possible to obtain a separation membrane element in which fouling that occurs during the operation of the separation membrane element can be made to proceed more slowly and an increase in differential pressure due to clogging of the feed-side channels can be inhibited and which therefore has excellent operation stability. In the case of the structure in which a large-diameter part has been disposed at one end of a small-diameter part as illustrated in FIG. 3, the way in which feed water flows varies depending on the direction in which the feed water is flowing in (for example, (201), (202), and (203) in FIG. 3), but it can be suitably changed in accordance with the quality of the feed water.

In cases when both the fiber-form objects A and the fiber-form objects B have small-diameter parts, the feed water spreads evenly when flowing through the feed-side channels and this is effective in reducing the flow resistance. Meanwhile, in cases when either the fiber-form objects A or the fiber-form objects B have small-diameter parts, the feed water flows unevenly and this is effective in reducing the salt concentration in the surface of the separation membrane to lessen the influence of osmotic pressure. Namely, the disposition of small-diameter parts can be suitably selected in accordance with the quality of the feed water and operating conditions.

Another aspect of the feed-side channel material included in a separation membrane element of the present invention, as illustrated in FIG. 4, has regions which have been separated by fiber-form objects, i.e., reticulate regions (50), and are reticulately continuous. As FIG. 5 illustrates, the reticulate regions (50) each are defined by four approximate curves (51), (52), (53), and (54), two approximate curves of which form an approximate parabola ((51) and (54)). Furthermore, as FIG. 5 illustrates, in cases when a straight line connecting both ends of the approximate parabola is referred to as straight line L, and when the area of a portion surrounded by the straight line L and the approximate parabola ((51) and (54)) is expressed by S1 and the area of a portion in the reticulate region (50) other than S1 is expressed by S2, then the S1 and the S2 satisfy the relationship S1>S2. In cases when the feed-side channel material has such a structure, feed water, when passing through the separated regions, is disordered in flow with the straight lines L as boundaries, and is apt to flow along the fiber-form objects since the fiber-form objects are approximately curved. Thus, the feed water can be inhibited from peeling off and, hence, the flow resistance can be reduced. As a result, this configuration has the effects of inhibiting the adhesion of foulants to the fiber-form objects and inhibiting the surface of the separation membrane from undergoing concentration polarization.

In particular, from the standpoint of enhancing these effects, the proportion of S2 to S1 (value of S2/S1) is preferably 0.10-0.70, more preferably 0.33-0.55.

The S1 and S2 can be determined by arbitrarily selecting a reticulate region and examining the selected region using a commercial microscope to perform measurement in the area measuring mode.

Each reticulate region is defined by four approximate curves. In one reticulate region and reticulate regions which adjoin said one reticulate region in directions perpendicular to the straight line L, the approximate curves do not lie on straight lines which connect the intersections, as illustrated in FIG. 6, unlike those in conventional feed-side channel materials. As a result, a feed-side channel material which is highly effective in lowering flow resistance, diminishing the adhesion of foulants, and inhibiting concentration polarization is rendered possible.

The fiber-form objects which separate the reticulate regions have large-diameter parts (not shown) having a diameter R1 and small-diameter parts (not shown) having a diameter R2, the R1 and the R2 satisfying the relationship R1>R2.

In either a feed-side channel material in the mode illustrated in FIG. 2 or FIG. 3 or a feed-side channel material in the mode illustrated in FIG. 4, etc., the proportion of the diameter R2, which is the average diameter of the small-diameter parts, to the diameter R1, which is the average diameter of the large-diameter parts, is preferably 0.17 or more and 0.78 or less, more preferably 0.3 or more and 0.5 or less, from the standpoint of facilitating guiding of the flow of feed water.

Furthermore, the proportion of the length c (see FIG. 2) of the small-diameter parts to the interval between the intersections in a feed-side channel material or the proportion of the length (not shown) of the small-diameter parts to the length of the approximate parabolas which connect intersections in a feed-side channel material is preferably 0.25 or more and 0.80 or less, more preferably 0.35 or more and 0.50 or less, from the standpoint that feed water which is stagnating around the intersections is made apt to flow downstream (toward the concentrate discharge part of the separation membrane element).

In cases when any of such feed-side channel materials is applied to a separation membrane element, this element has a configuration in which the feed-side channel material is enveloped in a separation membrane. However, in cases when the small-diameter parts have been disposed in the center position with respect to the large-diameter parts in the thickness direction of the feed-side channel material, spaces are formed in a larger amount between the fiber-form objects of the feed-side channel material and the separation membrane. It is hence preferred.

(Examination of the Small-Diameter Parts and Large-Diameter Parts)

In a section (hereinafter "section S") obtained by cutting each fiber-form object along the center thereof in the thickness direction in an examination of the feed-side channel material from above the plane thereof, the thickness of the small-diameter parts and that of the large-diameter parts in FIG. 2, etc. are the diameters thereof. Namely, the section S is only required to include small-diameter parts and large-diameter parts, and in cases when, for example, each fibrous row is cut along the thickness-direction center in the direction of the plane of the fibrous row in an examination thereof from above the plane, then this section need not include any small-diameter part or large-diameter part.

In a fiber-form object between intersections, any region having a thickness not less than 50% of the thickness of the intersections is a large-diameter part and any region having a thickness up to 80% of the average diameter of such large-diameter parts is a small-diameter part. The diameters of a fiber-form object can be determined by examining the section S with a commercial microscope to measure the thicknesses. The average diameters, i.e., the diameter R1 of the large-diameter parts and the diameter R2 of the small-diameter parts can be determined by measuring the diameters of arbitrarily selected 30 portions of small-diameter or large-diameter parts using the measuring mode and calculating an average value thereof.

(Diameter Evenness of the Small-diameter Parts)

The small-diameter parts have a coefficient of variation in diameter of preferably 1% or more and 11% or less, more preferably 1% or more and 7% or less, still more preferably 1% or more and 5% or less, from the standpoints of reducing friction between the feed-side channel material and feed water to diminish the adhesion of foulants and improve turbidity-eliminating properties and of moderately disturbing the flow of the feed water. The coefficient of variation in diameter of the small-diameter parts can be determined from a standard deviation of the measured values for 30 portions obtained in calculating the diameter R2 of the small-diameter parts, by dividing the standard deviation by the value of the diameter R2, followed by converting into a percentage.

Namely, the smaller the value, the higher the diameter evenness of the small-diameter parts.

(Tensile Modulus of the Small-diameter Parts)

Conventional feed-side channel materials need to have enhanced rigidity for maintaining handleability in production steps. However, in the feed-side channel material included in a separation membrane element of the present invention, the rigidity of the feed-side channel material can be ensured with the large-diameter parts and, hence, it is possible to make the small-diameter parts have a reduced modulus so that the small-diameter parts vibrate upon contact with feed water and thereby stir the feed water to improve the intensity of turbulent flows. In a feed-side channel material in the mode illustrated in, for example, FIG. 2 or FIG. 3, both the fiber-form objects A and the fiber-form objects B have small-diameter parts and large-diameter parts between adjacent intersections, and the effect shown above can hence be heightened. From this standpoint, the tensile modulus of the small-diameter parts is preferably 200 MPa or more and 1,000 MPa or less, more preferably 300 MPa or more and 600 MPa or less. The tensile modulus can be measured by setting the small-diameter part on a commercial tensile tester and performing a tensile test.

(Angle between Feed-water Flow Direction and Fiber-form Objects)

As the angle between the flow direction of feed water (i.e., the longitudinal direction of the water collection tube) and fiber-form objects becomes larger, the intensity of turbulent flows increases but the flow resistance tends to increase. The angle therebetween hence is preferably 15° or more and 50° or less, more preferably 30° or more and 45° or less.

(Thickness)

The thickness of a feed-side channel material in the mode illustrated in FIG. 2 or FIG. 3 substantially corresponds to the thickness of the intersections of the fiber-form objects A and the fiber-form objects B. Namely, it is the sum of the thickness of the fiber-form objects A and the thickness of the fiber-form objects B. Meanwhile, in the case of a feed-side channel material in the mode illustrated in FIG. 4, etc., the thickness corresponds to the thickness of the intersections of the fiber-form objects which lie around the central of approximate parabolas. In cases when the feed-side channel materials has a reduced thickness, the feed water has an increased membrane-surface linear velocity to show turbulent flows on the surface of the separation membrane and this results in a decrease in the thickness of the concentration-polarization layer to improve the separation performance of the separation membrane element. It is hence preferred. However, in case where the thickness of the feed-side channel material is made too small, there is a tendency that foulants in the feed water, such as impurities and microorganisms, clog the feed-side channels. This poses a problem in that the separation membrane element is reduced in water production rate or increased in flow resistance to heighten the power necessary for the pump for supplying the feed water, resulting in an increase in electric-power cost, or to cause a damage to the separation membrane element. It is hence undesirable. Consequently, the average thickness of the feed-side channel material is preferably 0.20 mm or more and 1.5 mm or less, more preferably 0.32 mm or more and 0.85 mm or less, still more preferably 0.50 mm or more and 0.80 mm or less.

The average thickness of a feed-side channel material can be determined by measuring the thicknesses of arbitrarily selected 10 or more intersections of the fiber-form objects or, in the case of a feed-side channel material in the mode illustrated in FIG. 2 or FIG. 3, the thicknesses of the fiber-form objects A and fiber-form objects B, with a precision thickness gauge or the like and calculating an average value based on total thickness thereof.

A feed-side channel material having high unevenness in thickness is undesirable because this channel material prevents a reverse osmosis membrane from evenly exhibiting the performance thereof. Consequently, the thicknesses of the intersections of the fiber-form objects A and fiber-form objects B are each preferably in the range of 0.9 times or more and 1.1 times or less the average thickness of the feed-side channel material.

(Materials)

Materials for constituting the feed-side channel materials are not particularly limited. From the standpoint of moldability, however, thermoplastic resins are preferred. In particular, polyethylene and polypropylene are suitable because they are less apt to damage the surface of the separation membrane and are inexpensive.

(Friction with Separation Membrane Surface)

In cases when feed water is treated under high pressure as in a spiral-type separation membrane element, there are cases where the feed-side channels become loose due to the compression of the permeate-side channel material and the creeping of the separation membrane, thereby causing the feed-side channel material to be pushed downstream and protrude from the edge face of the spiral-type separation membrane element. Then, feed-side channels are not ensured and, hence, the filtration performance decreases abruptly and operation troubles may arise. Consequently, in cases when the fiber-form objects are made to have a noncircular cross-section so as to have an increased area of contact with the separation membrane surface, friction with the separation membrane surface renders this feed-side channel material less apt to be pushed downstream even when the feed-side channels become loose during operation.

(Interval Between Intersections of Fiber-Form Objects in Feed-Side Channel Material)

In a feed-side channel material (2) formed by arranging fiber-form objects A (21) and fiber-form objects B (22) as illustrated in FIG. 2 or FIG. 3, the plurality of fiber-form objects A (21) have been disposed approximately parallel to each other. Likewise, the plurality of fiber-form objects B (22) have also been disposed approximately parallel to each other.

Each of the intersections formed by the fiber-form objects A (21) and fiber-form objects B (22) has a certain distance from an intersection adjacent thereto. As FIG. 2 shows, the interval between intersections in the fiber-form objects A (21) is "a", and the interval between intersections in the fiber-form objects B (22) is "b". Namely, the interval between intersections is the distance between the central of an intersection and the central of an adjacent intersection.

The smaller the interval between intersections, the more the flow resistance tends to increase but the more the rigidity of the feed-side channel material as a whole tends to increase. The interval hence can be widely changed in accordance with the thickness of the feed-side channel material and the properties of the feed water.

For determining the interval between intersections, use can be made of a method in which the feed-side channel material is examined from above along the thickness direction and measuring the distance with, for example, a microscope.

The feed-side channel material illustrated in FIG. 2 has a configuration in which both the fiber-form objects A and the fiber-form objects B have small-diameter parts therein and large-diameter parts have been disposed at both ends of each small-diameter part. However, the above explanation applies also in the configuration in which only either the fiber-form objects A or the fiber-form objects B have small-diameter parts and in the configuration in which a large-diameter part has been disposed only at one end of each small-diameter part, as described above.

(Distance between Intersections in Reticulate Regions of Feed-side Channel Material)

In reticulate regions, each of the intersections formed on approximate parabolas has a certain distance from an intersection adjacent thereto. As FIG. 7 shows, the distances d and e between intersections in reticular regions each are the distance between the center of an intersection and the center of an intersection adjacent thereto.

The smaller the distance between intersections, the more the flow resistance tends to increase but the more the rigidity of the feed-side channel material as a whole tends to increase. The distance between intersections hence can be widely changed in accordance with the thickness of the feed-side channel material and the properties of the feed water.

For determining the distance between intersections, use can be made of a method in which the feed-side channel material is examined with a commercial microscope from above along the thickness direction to measure the distance.

(Production Methods)

In the case where a feed-side channel material including fiber-form objects in which regions differing in fiber diameter are present between intersections is to be produced by after processing of a net having a relatively even fiber diameter while maintaining the thickness of the intersections, use can be made of: a method of drawing until the fiber-form objects undergo necking; and a method in which portions of the fiber-form objects which lie between the intersections are compressed and deformed by embossing, imprinting, pressing, etc. The term "necking" means a phenomenon in which a polymer specimen, upon stretching, extends unevenly, yields, and then forms a constriction.

For producing the feed-side channel material to be included in a separation membrane element of the present invention, a 3D printer may be used.

(Feed Water)

The feed water to be supplied to the separation membrane elements of the present invention is not particularly limited, and may be either tap water, which has been treated beforehand, or water containing a large amount of impurities in solution, such as seawater or brackish water.

<Permeate-side Channel Material>

Between separation membranes which hold a permeate-side channel material therebetween, permeate-side channels are formed due to the permeate-side channel material. Materials for constituting the permeate-side channel material are not limited, and use can be made of tricot, nonwoven fabric, a porous sheet having projections adhered thereto, a film obtained through ruggedness forming and perforation, or rugged nonwoven fabric. It is also possible to bond projections functioning as a permeate-side channel material to the permeate side of a separation membrane.

<Formation of Separation Membrane Leaf>

A separation membrane may be formed by folding the separation membrane so that the feed-side surface thereof faces inward as stated above, or two separate separation membranes may be sealed together so that the feed-side surfaces thereof face each other.

Examples of methods for the "sealing" include bonding with an adhesive, a hot-melting, etc., fusion bonding by heating or with a laser, etc., and a method in which a rubber sheet is sandwiched. Sealing by bonding is especially preferred because this method is the simplest and highly effective.

<Utilization of the Separation Membrane Element>

The separation membrane elements may be further connected serially or in parallel and disposed in a pressure vessel to be used as a separation membrane module.

The separation membrane elements or the separation membrane module can be combined with a pump for supplying a fluid thereto, a device for pretreating the fluid, etc. to configure a fluid separator. Use of this separator makes it possible to separate, for example, feed water into a permeate such as potable water and a concentrate which has not passed through the separation membrane. Thus, water suited for purposes can be obtained.

Higher operating pressures for the fluid separator improve the removal ratio but result in an increase in the quantity of energy necessary for the operation. In view of this and from the standpoint of maintaining the feed-side channels and permeate-side channels of the separation membrane elements, it is preferable that the operating pressure for passing feed water through the separation membrane module is 0.2 MPa or more and 5 MPa or less. Higher feed-water temperatures result in a decrease in salt removal ratio, but as the temperature declines, the membrane permeation flux also decreases. Consequently, it is preferably 5° C. or more and 45° C. or less. In cases when the feed water has a pH in a neutral range, the formation of scale of, for example, magnesium is inhibited and the separation membranes are inhibited from deteriorating, even when the feed water is a high-salt-concentration liquid such as seawater.

The fluid to be treated with the separation membrane elements is not particularly limited. In the case of using the elements for water treatment, examples of the feed water include liquid mixtures containing a TDS (total dissolved solids) of 500 mg/L or more and 100 g/L or less, such as seawater, brackish water, and wastewater. In general, TDS, which indicates the total content of dissolved solids, is expressed by "mass/volume". However, there are cases where 1 L is regarded as 1 kg to express the total content in terms of "mass ratio". According to a definition, it can be determined by filtering the liquid with a 0.45-μm filter, vaporizing the resultant solution at a temperature of 39.5-40.5° C., followed by calculating from the weight of the residue. A simpler method is to convert a practical salinity (S).

EXAMPLES

The present invention is described below in more detail with reference to the following Examples, but the present invention should not be construed as being limited by the following Examples in any way.

(Thickness of Feed-side Channel Material)

Intersections of a feed-side channel material sample having a size of 100 mm×100 mm were examined for thickness with a thickness gauge (product No. 547-360) manufactured by Mitsutoyo Corp. The values of thickness were summed up and the sum was divided by the total number of sites where the measurement had been made.

(Assessment of Small-diameter Parts and Large-diameter Parts of Feed-side Channel Material)

Using high-precision shape analysis system KS-1100, manufactured by Keyence Corp., the plane and a section S of a feed-side channel material were examined at a magnification of 20 diameters to determine whether large-diameter parts and small-diameter parts were present or not. Specifically, in this examination, in cases when a fiber portion between intersections included a region where a reduction in diameter of 20% or larger had occurred, it was deemed that a small-diameter part and a large-diameter part were present. The thin region was regarded as the small-diameter part, and the thick region was regarded as the large-diameter part.

(Average Diameters of Small-diameter Parts and Large-diameter Parts and Proportion therebetween)

Using high-precision shape analysis system KS-1100, manufactured by Keyence Corp., each 30 portions of small-diameter parts and large-diameter parts of a feed-side channel material were examined for diameter. Average values thereof were calculated to obtain the diameter R2 of the small-diameter parts and the diameter R1 of the large-diameter parts. Next, the diameter R2 was divided by the diameter R1, the resultant quotient being the proportion of the diameter R2 of the small-diameter parts to the diameter R1 of the large-diameter parts.

(Proportion of Length of Small-diameter Part to Interval between Intersections)

The distance between the center of an arbitrarily selected intersection of a feed-side channel material and the center of an intersection adjacent to said intersection in the direction of the fiber-form object (in a feed-side channel material in the mode illustrated in FIG. 4, the length of the approximate parabola connecting the centers of intersections) was measured using high-precision shape analysis system KS-1100, manufactured by Keyence Corp. The measured distance was taken as the interval between intersections. The length of a small-diameter part lying between the intersections was measured, and the proportion thereof was determined. This operation was performed with respect to other arbitrarily selected pairs of intersections, and 30 portions in total were thus examined. An average value of these was taken as the proportion of the length of the small-diameter part to the interval between intersections.

(Fiber Diameter Evenness of Small-diameter Parts)

A standard deviation of the measured values for 30 portions obtained in calculating the diameter R2 of the small-diameter parts was divided by the value of the diameter R2, followed by converting into a percentage to calculate the coefficient of variation.

(Tensile Modulus)

Arbitrarily selected 50 small-diameter parts of a feed-side channel material were taken out in the state of having a largest possible fiber length. This length was taken as a measurement length. A tensile test (pulling speed, 5 mm/min) was performed using a tensile tester.

The 50 values of tensile modulus obtained in total from the measurements were averaged, and the average value was taken as the tensile modulus of the small-diameter parts.

(Production of Feed-side Channel Materials A)

Netty samples in the mode illustrated in FIG. 2 or FIG. 3 were produced by melt molding from polypropylene as a material and then biaxially drawn in an 80° C. environment to produce feed-side channel materials each having small-diameter parts and large-diameter parts. The netty samples were produced so as to differ in reticulate opening size, and structural control of the feed-side channel materials to be obtained was performed thereby. Features of the feed-side channel materials are summarized in Tables 1 to 3.

(Production of Feed-side Channel Materials B)

Netty samples in the mode illustrated in FIG. 4 were produced by melt molding from polypropylene as a material and then uniaxially drawn in a 45° C. environment to produce feed-side channel materials each having small-diameter parts and large-diameter parts. The netty samples were produced so as to differ in reticulate region shape, etc., and structural control of the feed-side channel materials to be obtained was performed thereby.

(Initial Differential Pressure)

Each netty sample was cut into a size of 50 mm×400 mm and attached to an evaluation cell so that feed water flowed through the channel formed by the netty sample, from plane-direction one end toward the other end of the netty sample. Next, distilled water was fed to the evaluation cell at a flow rate of 0.2 L/min. The difference between numerical values which were indicated, at 5 minutes after initiation of the feeding, by pressure gauges respectively disposed at 10 mm downstream from the inlet of the channel and at 10 mm from the outlet was taken as the initial differential pressure (kPa). With respect to the netty samples having a large-diameter part at one end of a small-diameter part, the direction of the flow of feed water was adjusted to the (201) shown in FIG. 3.

(Increase in Differential Pressure)

The same evaluation cell as in the measurement of initial differential pressure was used, and water from Lake Biwa was fed as feed water for 100 hours at a flow rate of 0.2 L/min to read the difference between numerical values indicated by the pressure gauges disposed at the inlet and outlet of the channel. The initial differential pressure was subtracted from the difference, and the value thus calculated was taken as the increase in differential pressure (kPa).

(Water Production Rate)

A 15 mass % dimethylformamide (DMF) solution of a polysulfone was cast on polyester-fiber nonwoven fabric (air permeability, 1.0 cc/cm$^2$/sec) produced by a wet-laid paper method, at room temperature (25° C.) in a coating thickness of 180 μm, followed by immediately immersing in pure water for 5 minutes to thereby form a porous supporting layer on the base. Thus, a porous supporting membrane was produced.

Next, immersing was performed for 10 seconds in an aqueous solution of 2.0 mass % 2-ethylpiperazine, 100 ppm sodium dodecyl (diphenyl ether)disulfonate, and 1.0 mass % trisodium phosphate, followed by blowing nitrogen from an air nozzle to remove the excess aqueous solution. The aqueous amine solution had a pH of 12.0. Subsequently, an n-decane solution containing 0.2 mass % trimesoyl chloride and heated at 70° C. was evenly applied to the surface of the porous supporting layer, and the coated porous supporting layer was held at a membrane surface temperature of 60° C. for 3 seconds, then cooled to a membrane surface temperature of 10° C., and allowed to stand in an air atmosphere for 1 minute while maintaining that temperature, thereby forming a separation functional layer. The membrane was then held vertically to remove the excess solution. The membrane thus obtained was rinsed with 60° C. pure water for 2 minutes to obtain a separation membrane roll.

The separation membrane thus obtained was subjected to folding and cutting so as to result in an effective area in a separation membrane element of 1.8 m². A net shown in Table 1 was used as a feed-side channel material to produce three sheets of the separation membrane leaf (width, 920 mm).

The permeate-side channel material shown in Table 1 was laid as the permeate-side channel material on the permeate-side surface of each leaf obtained, followed by spirally winding around a water collection tube made of ABS (acrylonitrile/butadiene/styrene) (width, 1,000 mm; diameter, 18 mm; having 40 holes linearly arranged in one row). Both ends were subjected to edge cutting to produce a separation membrane element having a diameter of 2 inches.

The separation membrane element was disposed in a pressure vessel. An aqueous NaCl solution having a concentration of 200 ppm and a pH of 6.5 were used as feed water to perform operation for 15 minutes under the conditions of an operating pressure of 0.41 MPa and a temperature of 25° C. Thereafter, 1-minute sampling was conducted to determine the water permeability (gallons) per day, which was expressed in terms of water production rate (GPD (gallons/day)). The recovery was set at 5%.

(Removal Ratio (TDS Removal Ratio))

The feed water used for the 1-minute operation in determining the water production rate and the permeate obtained by the sampling were examined for TDS concentration through a conductivity measurement. The TDS removal ratio was calculated using the following equation.

TDS removal ratio (%)=100×{1−((TDS concentration in permeate)/(TDS concentration in feed water))}

Example 1

An evaluation cell was used for the feed-side channel material produced and the separation membrane element was disposed in a pressure vessel to perform evaluation under the conditions shown above. The results obtained are shown in Table 1.

TABLE 1

| | | Example 1 | Example 2 | Example 3 | Example 4 | Example 5 |
|---|---|---|---|---|---|---|
| Feed-side channel material | Kind | A | A | A | A | A |
| | Disposition of large-diameter part with respect to small-diameter part | both ends | both ends | one end | one end | one end |
| | Thickness (mm) | 0.58 | 0.58 | 0.58 | 0.58 | 0.58 |
| | Interval a between intersections in fiber-form object A (mm) | 4.5 | 4.5 | 4.5 | 4.5 | 4.5 |
| | Interval b between intersections in fiber-form object B (mm) | 4.5 | 4.5 | 4.5 | 4.5 | 4.5 |
| Fiber-form objects A, B | Large-diameter parts — Diameter R1 (mm) | 0.30 | 0.30 | 0.30 | 0.30 | 0.30 |
| | Small-diameter parts — Diameter R2 (mm) | 0.12 | 0.28 | 0.08 | 0.28 | 0.27 |
| | Thickness-direction disposition with respect to large-diameter part | one end | middle | middle | middle | middle |
| | Proportion of length of small-diameter part to interval between intersections | 0.4 | 0.92 | 0.25 | 0.92 | 0.89 |
| | Tensile modulus (MPa) | 880 | 80 | 490 | 80 | 140 |
| | Coefficient of variation of diameter of small-diameter parts (%) | 7 | 21 | 7 | 13 | 10 |
| Flow resistance of feed-side channel material | Initial differential pressure (kPa) | 11 | 10 | 9.3 | 8.7 | 7.7 |
| | Increase in differential pressure (kPa) | 14 | 13 | 9.4 | 7.7 | 7.0 |
| Element performance | Water production rate (GPD) | 300 | 300 | 310 | 303 | 305 |
| | Removal ratio (%) | 99.80 | 99.87 | 99.90 | 99.82 | 99.82 |

Examples 2 to 14

Separation membrane elements were produced in the same manner as in Example 1, except that the feed-side channel material was replaced with those shown in Tables 1 to 3.

The separation membrane elements were each disposed in a pressure vessel and evaluated for the performances under the same conditions as in Example 1. The results obtained are shown in Tables 1 to 3.

Examples 15 to 21

Separation membrane elements were produced in the same manner as in Example 1, except that the feed-side channel material was replaced with those shown in Table 4.

The separation membrane elements were each disposed in a pressure vessel and evaluated for the performances under the same conditions as in Example 1. The results obtained are shown in Table 4.

TABLE 2

| | | Example 6 | Example 7 | Example 8 | Example 9 | Example 10 |
|---|---|---|---|---|---|---|
| Feed-side channel material | Kind | A | A | A | A | A |
| | Disposition of large-diameter part with respect to small-diameter part | one end | one end | one end | one end | one end |
| | Thickness (mm) | 0.58 | 0.58 | 0.58 | 0.58 | 0.58 |
| | Interval a between intersections in fiber-form object A (mm) | 4.5 | 4.5 | 4.5 | 4.5 | 4.5 |
| | Interval b between intersections in fiber-form object B (mm) | 4.5 | 4.5 | 4.5 | 4.5 | 4.5 |
| Fiber-form objects A, B | Large-diameter parts Diameter R1 (mm) | 0.30 | 0.30 | 0.30 | 0.30 | 0.30 |
| | Small-diameter parts Diameter R2 (mm) | 0.05 | 0.26 | 0.09 | 0.15 | 0.11 |
| | Thickness-direction disposition with respect to large-diameter part | middle | middle | middle | middle | middle |
| | Proportion of length of small-diameter part to interval between intersections | 0.16 | 0.86 | 0.3 | 0.5 | 0.35 |
| | Tensile modulus (MPa) | 1400 | 1200 | 1100 | 1040 | 280 |
| | Coefficient of variation of diameter of small-diameter parts (%) | 10 | 9 | 8 | 7 | 7 |
| Flow resistance of feed-side channel material | Initial differential pressure (kPa) | 8.0 | 6.3 | 6.7 | 5.7 | 7.0 |
| | Increase in differential pressure (kPa) | 7.0 | 5.6 | 5.0 | 4.8 | 4.5 |
| Element performance | Water production rate (GPD) | 320 | 310 | 310 | 308 | 303 |
| | Removal ratio (%) | 99.81 | 99.83 | 99.83 | 99.83 | 99.84 |

TABLE 3

| | | Example 11 | Example 12 | Example 13 | Example 14 | Comparative Example 1 | Comparative Example 2 |
|---|---|---|---|---|---|---|---|
| Feed-side channel material | Kind | A | A | A | A | — | — |
| | Disposition of large-diameter part with respect to small-diameter part | one end | one end | one end | one end | — | — |
| | Thickness (mm) | 0.58 | 0.58 | 0.58 | 0.58 | 0.58 | 0.76 |
| | Interval a between intersections in fiber-form object A (mm) | 4.5 | 4.5 | 4.5 | 4.5 | 4.5 | 8.1 |
| | Interval b between intersections in fiber-form object B (mm) | 4.5 | 4.5 | 4.5 | 4.5 | 4.5 | 8.1 |
| Fiber-form objects A, B | Large-diameter parts Diameter R1 (mm) | 0.30 | 0.30 | 0.30 | 0.30 | 0.30 | 0.30 |
| | Small-diameter parts Diameter R2 (mm) | 0.15 | 0.12 | 0.11 | 0.14 | — | — |
| | Thickness-direction disposition with respect to large-diameter part | middle | middle | middle | middle | — | — |
| | Proportion of length of small-diameter part to interval between intersections | 0.5 | 0.39 | 0.35 | 0.45 | — | — |
| | Tensile modulus (MPa) | 1000 | 420 | 380 | 450 | — | — |
| | Coefficient of variation of diameter of small-diameter parts (%) | 7 | 6 | 1 | 4 | — | — |
| Flow resistance of feed-side channel material | Initial differential pressure (kPa) | 5.3 | 5.0 | 4.7 | 5.0 | 24 | 8 |
| | Increase in differential pressure (kPa) | 4.0 | 3.6 | 3.3 | 3.4 | 23 | 22 |
| Element performance | Water production rate (GPD) | 308 | 312 | 315 | 315 | 290 | 310 |
| | Removal ratio (%) | 99.83 | 99.85 | 99.87 | 99.86 | 99.84 | 99.57 |

TABLE 4

| | | Example 15 | Example 16 | Example 17 | Example 18 | Example 19 | Example 20 | Example 21 |
|---|---|---|---|---|---|---|---|---|
| Feed-side channel material | Kind | B | B | B | B | B | B | B |
| | Thickness (mm) | 0.58 | 0.58 | 0.58 | 0.58 | 0.58 | 0.58 | 0.58 |
| | Distance d between intersections in reticulate regions (mm) | 3.5 | 3.5 | 3.5 | 3.5 | 3.5 | 3.5 | 3.5 |
| | Distance e between intersections in reticulate regions (mm) | 4.2 | 4.2 | 4.2 | 3.5 | 3.5 | 4.2 | 4.2 |
| Reticulate regions/ fiber-form objects | Areal ratio S2/S1 | 0.03 | 0.10 | 0.30 | 0.50 | 0.77 | 0.90 | 0.67 |
| | Small-diameter parts/large-diameter parts Thickness-direction disposition of small-diameter part with respect to large-diameter part | middle | middle | middle | middle | middle | middle | middle |
| | Proportion of diameter R2 to R1 (R2/R1) | 0.21 | 0.21 | 0.21 | 0.21 | 0.21 | 0.21 | 0.21 |

TABLE 4-continued

|  |  | Example 15 | Example 16 | Example 17 | Example 18 | Example 19 | Example 20 | Example 21 |
|---|---|---|---|---|---|---|---|---|
|  | Proportion of length of small-diameter part to length of approximate parabola connecting intersections | 0.89 | 0.89 | 0.89 | 0.89 | 0.89 | 0.89 | 0.89 |
| Small-diameter parts | Tensile modulus (MPa) | 50 | 150 | 280 | 360 | 710 | 1000 | 540 |
| Flow resistance of feed-side channel material | Initial differential pressure (kPa) | 13.0 | 12.5 | 7.3 | 6.5 | 5.2 | 6.0 | 4.5 |
|  | Increase in differential pressure (kPa) | 13.0 | 12.0 | 10.0 | 8.0 | 5.3 | 5.0 | 3.0 |
| Element performance | Water production rate (GPD) | 305 | 304 | 310 | 308 | 312 | 316 | 320 |
|  | Removal ratio (%) | 99.82 | 99.83 | 99.83 | 99.84 | 99.85 | 99.87 | 99.90 |

Comparative Examples 1 and 2

Separation membrane elements were produced in the same manner as in Example 1, except that the feed-side channel material was replaced with those shown in Table 3.

The separation membrane elements were each disposed in a pressure vessel and evaluated for the performances under the conditions described above. The results obtained are shown in Table 3.

Specifically, in Comparative Example 1, the distance between fiber-form objects A and the distance between fiber-form objects B in the feed-side channel material were equivalent to those in Examples 1 to 14 but these fiber-form objects were even in diameter. Because of this, the fiber-form objects were in contact with the separation membrane in a large area, resulting in a considerable increase in differential pressure. In addition, flow resistance was high and, hence, water production rate was reduced.

In Comparative Example 2, the fiber-form objects were even in diameter, but the distance between fiber-form objects A and the distance between fiber-form objects B were large and the channel material was thick. Flow resistance was hence low but the feed side channel material was insufficient in disturbing the flow of the feed water. A considerable increase in differential pressure and a considerable decrease in removal ratio were observed.

In Examples 15 to 21, in which feed-side channel materials each including reticulate regions having approximate parabolas had been applied, a considerable increase in differential pressure was observed and flow resistance was high. Water production rates were hence reduced.

As apparent from the results shown in Tables 1 to 4, the feed-side channel materials and separation membrane elements of Examples 1 to 21 do not obstruct the flow of feed water and stably have excellent separation performance.

INDUSTRIAL APPLICABILITY

The separation membrane elements of the present invention are especially suitable for use in RO water purifiers and for desalting brackish water or seawater.

While the invention has been described in detail and with reference to specific embodiments thereof, it will be apparent to one skilled in the art that various changes and modifications can be made therein without departing from the spirit and scope thereof.

This application is based on a Japanese patent application filed on May 30, 2017 (Application No. 2017-106238), a Japanese patent application filed on Sep. 26, 2017 (Application No. 2017-184498), and a Japanese patent application filed on Sep. 26, 2017 (Application No. 2017-184499), the contents thereof being incorporated herein by reference.

REFERENCE SIGNS LIST

1 Separation membrane
2 Feed-side channel material
21 Fiber-form object A
22 Fiber-form object B
3 Small-diameter part
4 Large-diameter part
50 Reticulate region
51, 52, 53, 54 Approximate curves forming approximate parabola
6 Water collection tube
100 Separation membrane element
201, 202, 203 Flow directions of feed water
a Interval between intersections in fiber-form object A
b Interval between intersections in fiber-form object B
c Length of small-diameter part
d Distance between intersections in reticulate region
e Distance between intersections in reticulate region
L Straight line connecting both ends of approximate parabola
S1 Area of portion surrounded by straight line L and approximate parabola
S2 Area of portion in reticulate region other than S1

The invention claimed is:

1. A separation membrane element comprising at least a water collection tube, a separation membrane, a feed-side channel material, and a permeate-side channel material, wherein
the feed-side channel material is configured of a fibrous row X configured of a plurality of fiber-form objects A arranged in one direction and a fibrous row Y configured of a plurality of fiber-form objects B arranged in a direction different from the direction for the fibrous row X,
the fiber-form objects A sterically intersect the fiber-form objects B to form intersections,
the fiber-form objects A and/or the fiber-form objects B have a small-diameter part formed by necking and a large-diameter part between adjacent intersections in a section thereof parallel to the respective fiber-form object wherein the large-diameter part has been disposed only at one end of the small-diameter part between adjacent intersections, and
the feed-side channel material has a proportion of a length of the small-diameter part to an interval between the intersections being 0.25 or more and 0.80 or less.

2. The separation membrane element according to claim 1, wherein a proportion of an average diameter of the small-diameter part to an average diameter of the large-diameter part is 0.17 or more and 0.78 or less.

3. The separation membrane element according to claim 1, wherein the small-diameter part has been disposed in a center position with respect to the large-diameter part in the thickness direction of the feed-side channel material.

4. The separation membrane element according to claim 1, wherein the small-diameter part has a tensile modulus of 200 MPa or more and 1,000 MPa or less.

* * * * *